US009510425B1

(12) United States Patent
Nelson

(10) Patent No.: US 9,510,425 B1
(45) Date of Patent: Nov. 29, 2016

(54) DRIVING CIRCUIT FOR LIGHT EMITTING DIODE APPARATUS AND METHOD OF OPERATION

(71) Applicant: Theodore G. Nelson, Portland, OR (US)

(72) Inventor: Theodore G. Nelson, Portland, OR (US)

( * ) Notice: Subject to any disclaimer, the term of this patent is extended or adjusted under 35 U.S.C. 154(b) by 0 days.

(21) Appl. No.: 13/774,915

(22) Filed: Feb. 22, 2013

Related U.S. Application Data

(60) Provisional application No. 61/614,298, filed on Mar. 22, 2012, provisional application No. 61/601,941, filed on Feb. 22, 2012.

(51) Int. Cl.
H05B 37/02 (2006.01)

(52) U.S. Cl.
CPC .................. H05B 37/02 (2013.01)

(58) Field of Classification Search
USPC ............ 315/291, 294, 297–312, 187
See application file for complete search history.

(56) References Cited

U.S. PATENT DOCUMENTS

| | | | |
|---|---|---|---|
| D344,605 S | 2/1994 | Aspenwall | |
| 5,475,241 A | 12/1995 | Harrah et al. | |
| 5,775,459 A | 7/1998 | Jorg et al. | |
| 6,045,240 A | 4/2000 | Hochstein | |
| D434,175 S | 11/2000 | Fahmian | |
| 6,183,100 B1 | 2/2001 | Suckow et al. | |
| 6,354,714 B1 | 3/2002 | Rhodes | |
| 6,371,636 B1 | 4/2002 | Wesson | |
| 6,441,943 B1 | 8/2002 | Roberts et al. | |
| 6,465,961 B1 | 10/2002 | Cao | |
| 6,601,976 B1 | 8/2003 | Rhee | |
| 6,659,632 B2 | 12/2003 | Chen | |
| 6,812,970 B1 | 11/2004 | McBride | |
| D508,575 S | 8/2005 | Buschmann et al. | |
| 6,982,518 B2 | 1/2006 | Chou et al. | |
| 6,997,576 B1 | 2/2006 | Lodhie et al. | |
| 7,014,336 B1 | 3/2006 | Ducharme et al. | |
| 7,038,399 B2 | 5/2006 | Lys et al. | |
| D528,227 S | 9/2006 | Chou et al. | |
| 7,102,902 B1 | 9/2006 | Brown et al. | |
| D531,741 S | 11/2006 | Takahashi | |

(Continued)

OTHER PUBLICATIONS

Ming-Hei Chu, Grantham Kwok-Hung Pang, "Solder Paste Inspection by Special LED Lighting for SMT Manufacturing of Printed Circuit Boards," Intelligent Manufacturing Systems, 8th IFAC International Workshop on Intelligent Manufacturing Systems, University of Alicante, Spain, May 23-25, 2007, pp. 222-226, vol. 8, Part 1.

(Continued)

*Primary Examiner* — Douglas W Ownes
*Assistant Examiner* — Jonathan Cooper
(74) *Attorney, Agent, or Firm* — Marger Johnson

(57) ABSTRACT

Disclosed is an LED bulb having a current-compensated driving circuit. A compensation current 352 is coupled to a main driving capacitor used to power LEDs and functions to keep the load current more constant. This has dual advantages of saving power and making the light output more uniform. Saving power also means that the circuit runs cooler than without compensation. Additionally this circuit includes an inductor placed in line with a driving capacitor. The inductor functions to reduce rapid current influx to the capacitor during operation of the driving circuit, which reduces EMF and reduces component stress. One benefit of using an inductor is that most of the current absorbed by the inductor is provided back to the circuit during a later portion of the AC cycle, which also limits energy losses by the driving circuit.

9 Claims, 6 Drawing Sheets

(56) References Cited

U.S. PATENT DOCUMENTS

| | | |
|---|---|---|
| 7,152,997 B1 | 12/2006 | Kovacik et al. |
| D534,665 S | 1/2007 | Egawa et al. |
| D538,953 S | 3/2007 | Mama |
| D541,440 S | 4/2007 | Feit |
| D545,477 S | 6/2007 | DeBruyne et al. |
| 7,255,457 B2 | 8/2007 | DuCharme et al. |
| D553,267 S | 10/2007 | Yuen |
| 7,352,138 B2 | 4/2008 | Lys et al. |
| D572,400 S | 7/2008 | Benensohn |
| 7,396,146 B2 | 7/2008 | Wang |
| D584,444 S | 1/2009 | Lipson |
| D584,844 S | 1/2009 | Ghini |
| 7,494,241 B2 | 2/2009 | McCarthy et al. |
| D590,523 S | 4/2009 | Takahashi |
| 7,556,406 B2 | 7/2009 | Petroski et al. |
| 7,677,768 B2 | 3/2010 | Huang et al. |
| 7,692,206 B2 | 4/2010 | Loh |
| 7,744,250 B2 | 6/2010 | Lee et al. |
| 7,841,741 B2 | 11/2010 | Chan et al. |
| 7,906,794 B2 | 3/2011 | Harrah et al. |
| 7,918,582 B2 | 4/2011 | Curran et al. |
| 7,938,562 B2 | 5/2011 | Ivey et al. |
| 7,942,556 B2 | 5/2011 | Harbers et al. |
| 7,946,729 B2 | 5/2011 | Ivey et al. |
| 7,959,327 B2 | 6/2011 | Lai et al. |
| 7,976,196 B2 | 7/2011 | Ivey et al. |
| 8,033,683 B2 | 10/2011 | Fields |
| 8,067,881 B2 | 11/2011 | Kazmierski |
| 8,098,003 B2 | 1/2012 | Morikawa et al. |
| 8,253,344 B2 | 8/2012 | Guest et al. |
| 2003/0127994 A1 | 7/2003 | Patchornik et al. |
| 2004/0114367 A1 | 6/2004 | Li |
| 2005/0253533 A1 | 11/2005 | Lys et al. |
| 2006/0113975 A1* | 6/2006 | Mednik et al. .............. 323/282 |
| 2007/0103086 A1 | 5/2007 | Neudorf et al. |
| 2007/0127235 A1 | 6/2007 | Cooper et al. |
| 2007/0267984 A1 | 11/2007 | Peng |
| 2007/0279903 A1 | 12/2007 | Negley et al. |
| 2008/0298058 A1 | 12/2008 | Kan et al. |
| 2009/0003009 A1 | 1/2009 | Tessnow et al. |
| 2009/0026982 A1 | 1/2009 | Lee et al. |
| 2009/0175041 A1 | 7/2009 | Yuen et al. |
| 2009/0213583 A1 | 8/2009 | Chang et al. |
| 2009/0294782 A1 | 12/2009 | Peng |
| 2010/0002466 A1 | 1/2010 | Kim et al. |
| 2010/0156325 A1* | 6/2010 | Nelson ..................... 315/307 |
| 2010/0207502 A1 | 8/2010 | Cao et al. |
| 2010/0207534 A1 | 8/2010 | Dowling et al. |
| 2010/0295439 A1 | 11/2010 | Oechsle et al. |
| 2011/0037409 A1 | 2/2011 | Van De Ven et al. |
| 2011/0049559 A1 | 3/2011 | Yen |
| 2011/0149563 A1 | 6/2011 | Hsia et al. |
| 2011/0176297 A1 | 7/2011 | Hsia et al. |
| 2011/0204778 A1* | 8/2011 | Sadwick et al. ............. 315/34 |
| 2011/0234078 A1 | 9/2011 | Choi et al. |
| 2011/0248619 A1 | 10/2011 | Loh |
| 2011/0260599 A1 | 10/2011 | Qiu |
| 2011/0298371 A1 | 12/2011 | Brandes et al. |
| 2011/0299292 A1 | 12/2011 | Preuschl |
| 2012/0032574 A1 | 2/2012 | Lin et al. |
| 2012/0106153 A1 | 5/2012 | Huang et al. |
| 2012/0170262 A1 | 7/2012 | Hoetzl et al. |
| 2012/0287614 A1 | 11/2012 | Kajiya et al. |
| 2013/0010463 A1 | 1/2013 | Li et al. |

OTHER PUBLICATIONS

Paul C.-P. Chao, Lun-De Liao, Chi-Wei Chiu, "Design of a Novel LED Lens Cap and Optimization of LED Placement in a Large Area Direct Backlight for LCD-TVs," SPIE Proceedings vol. 6196, Photonics in Multimedia, Apr. 21, 2006, 9 pages.

Jinbo Jiang, Sandy To, W.B. Lee, Benny Cheung, "Optical Design of a Freeform TIR Lens for LED Streetlight," Optik—International Journal for Light and Electron Optics, pp. 1761-1765, Oct. 2010, vol. 121, Issue 19.

Wilson, S., "New Perspectives on Packaging Surface-Mount LEDs," Electronic Engineering—London, Nov. 1996, p. 71, vol. 68, No. 839.

\* cited by examiner

| Cycle(A,B) Phase(Φ) | C1 (20uF) ΔV | C2 (20uF) ΔV | Q3 State | Q2 State | Q4,5,6 Current Source | D4 | D5 | L1 Current | C3 (20uF) ΔV |
|---|---|---|---|---|---|---|---|---|---|
| AΦ1 | Hold | Hold | OFF | OFF | OFF | OFF | OFF | 0 | 85 --> 50, -35 |
| AΦ2 | 85 --> 70, -15 | Hold | OFF | ON | ON | OFF | OFF | > 50uA > | 50 --> 70, 20 |
| AΦ3 | 70 --> 60, -10 | Hold | OFF | ON | ON | OFF | ON | > 50uA > | 70 --> 65, -5 |
| AΦ4 | 60 --> 85, 25 | Hold | OFF | OFF | OFF | OFF | ON | 0 | 65 --> 85, 20 |
| BΦ1 | Hold | Hold | OFF | OFF | OFF | OFF | OFF | 0 | 85 --> 50, -35 |
| BΦ2 | Hold | 85 --> 70, -15 | ON | OFF | ON | ON | OFF | > 50uA > | 50 --> 70, 20 |
| BΦ3 | Hold | 70 --> 60, -10 | ON | OFF | ON | ON | OFF | > 50uA > | 70 --> 65, -5 |
| BΦ4 | Hold | 60 --> 85, 25 | OFF | OFF | OFF | OFF | OFF | 0 | 65 --> 85, 20 |
| --> AΦ1 | | | | | | | | | |

FIG. 4

Time

/// Heat generated with no light, or no additional light

▓ Heat and light generated

DRIVING CIRCUIT FOR LIGHT EMITTING DIODE APPARATUS AND METHOD OF OPERATION

CROSS REFERENCE TO RELATED APPLICATIONS

This disclosure claims benefit of U.S. provisional application 61/614,298, filed Mar. 22, 2012 entitled DRIVING CIRCUIT FOR LIGHT EMITTING DIODE APPARATUS AND METHOD OF OPERATION, and claims benefit of U.S. provisional application 61/601,941, filed Feb. 22, 2012, entitled METHOD OF PRODUCING LED LIGHTING APPARATUS AND APPARATUS PRODUCED THEREBY, the contents of both of which are incorporated by reference herein. Additionally this disclosure is related to US non-provisional patent application entitled METHOD OF PRODUCING LED LIGHTING APPARATUS AND APPARATUS PRODUCED THEREBY, filed on even date herewith Ser. No. 13/774,941, which is incorporated by reference herein.

FIELD OF THE INVENTION

This disclosure is directed to lighting, and, more particularly, to a new driving circuit for a Light Emitting Diode (LED) lighting apparatus, and methods of the circuit operation.

BACKGROUND

Light Emitting Diodes (LEDs) are specialized diodes made from semiconductor material or materials. LEDs differ from standard diodes in that, when LEDs are energized by small amounts of electric current, they emit light that is visible to humans. Early generation LEDs generated primarily red, yellow, or green colored lights, but relatively recent advances in LED technology provide blue and white LED lights as well. White LEDs may be particularly bright, and, because they are made of a stable, solid state material, have a very long working lifetime. Additionally, LEDs operate at relatively low voltage, and their electrical current requirements are decreasing as LED technology matures.

Although LEDs operate at relatively low voltage, in general, individual LEDs do not generate a large amount of light, such as for room lighting, or even for general reading, for example. Instead, multiples of individual LEDs are often grouped together and operated in concert. When added together, light from a group of LEDs may be used to replace general room lighting. As described above, LEDs have a fantastically long operational life, and are therefore cost effective from a replacement standpoint. To gain even wider adoption, however, total cost of operation, including operating cost in the form of electric power should be reduced.

Embodiments of the invention address this and other limitations of the prior art.

BRIEF DESCRIPTION OF THE DRAWINGS

FIG. 4 is a table illustrating various phases of operation of the circuit according to embodiments of the invention.

DETAILED DESCRIPTION

Figure 1:
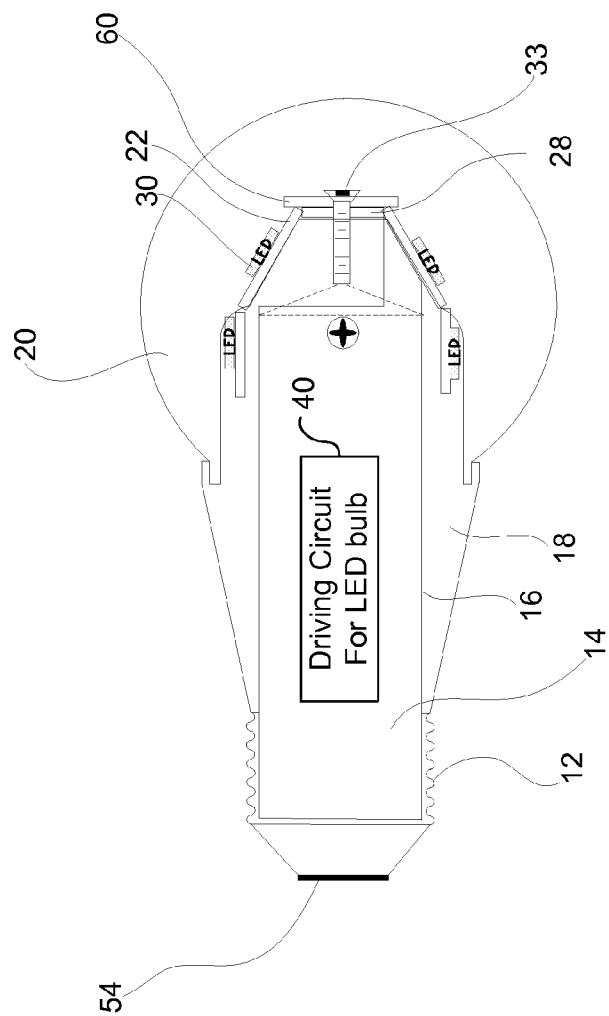
FIG. 1 is a side view of an LED bulb including a driving circuit according to embodiments of the invention.

FIG. 1 is a side view of an LED bulb 10 that may be driven by a driving circuit according to embodiments of the invention. In general, a driving circuit 40 is located inside the LED bulb 10. The driving circuit 40 connects between an energy source, such as the electrical socket served by an Edison screw 12, and the load, which is made of a number of individual LED devices 30, mounted in an array. In disclosed embodiments, the LED array includes twelve LED devices 30, wired in series. Of course, countless variations are possible, such as number of LED devices and how they are connected, for example in series, parallel, or mixed series and parallel without deviating from the scope of the invention.

A circuit board 14, hereinafter called the main board 14, may be conveniently partially or fully contained within a support 16, which runs through the middle of the bulb 10. The main board 14 is a printed circuit board that supports the driving circuitry 40, as described in detail below.

Figure 2:
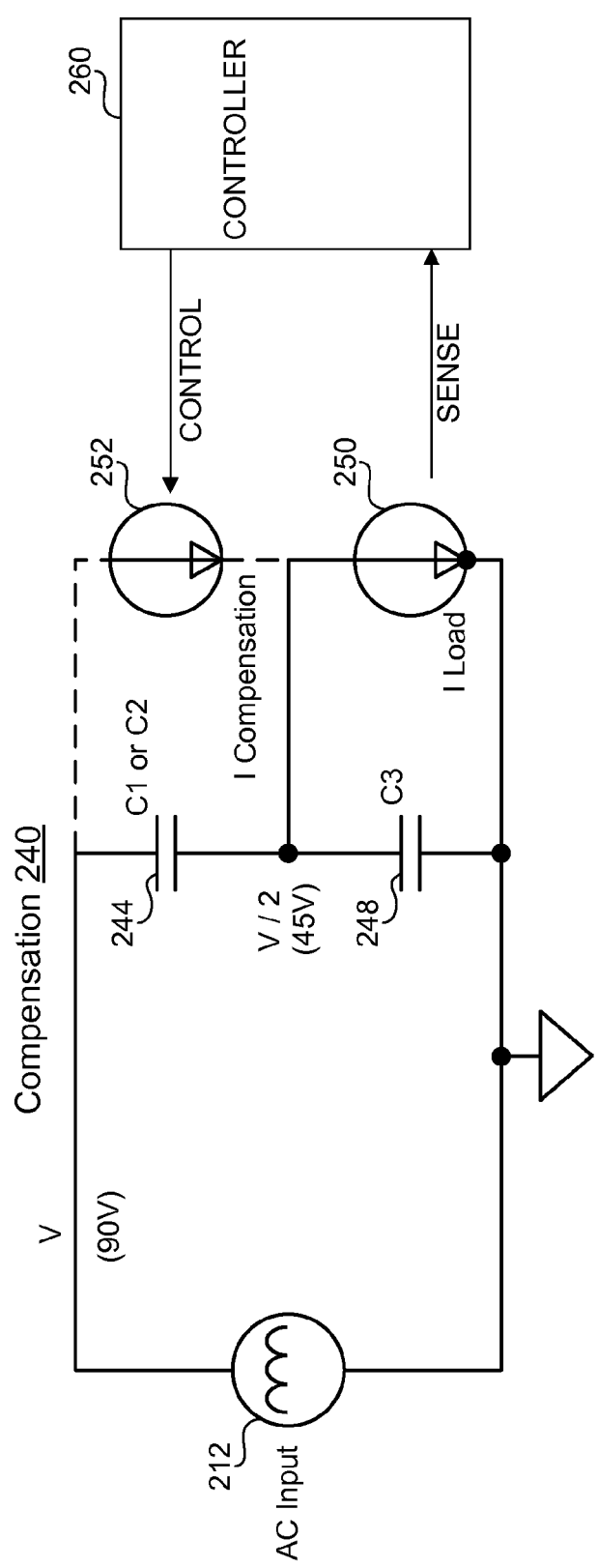
FIG. 2 is a schematic diagram illustrating general concepts of embodiments of the invention.
Figure 3:
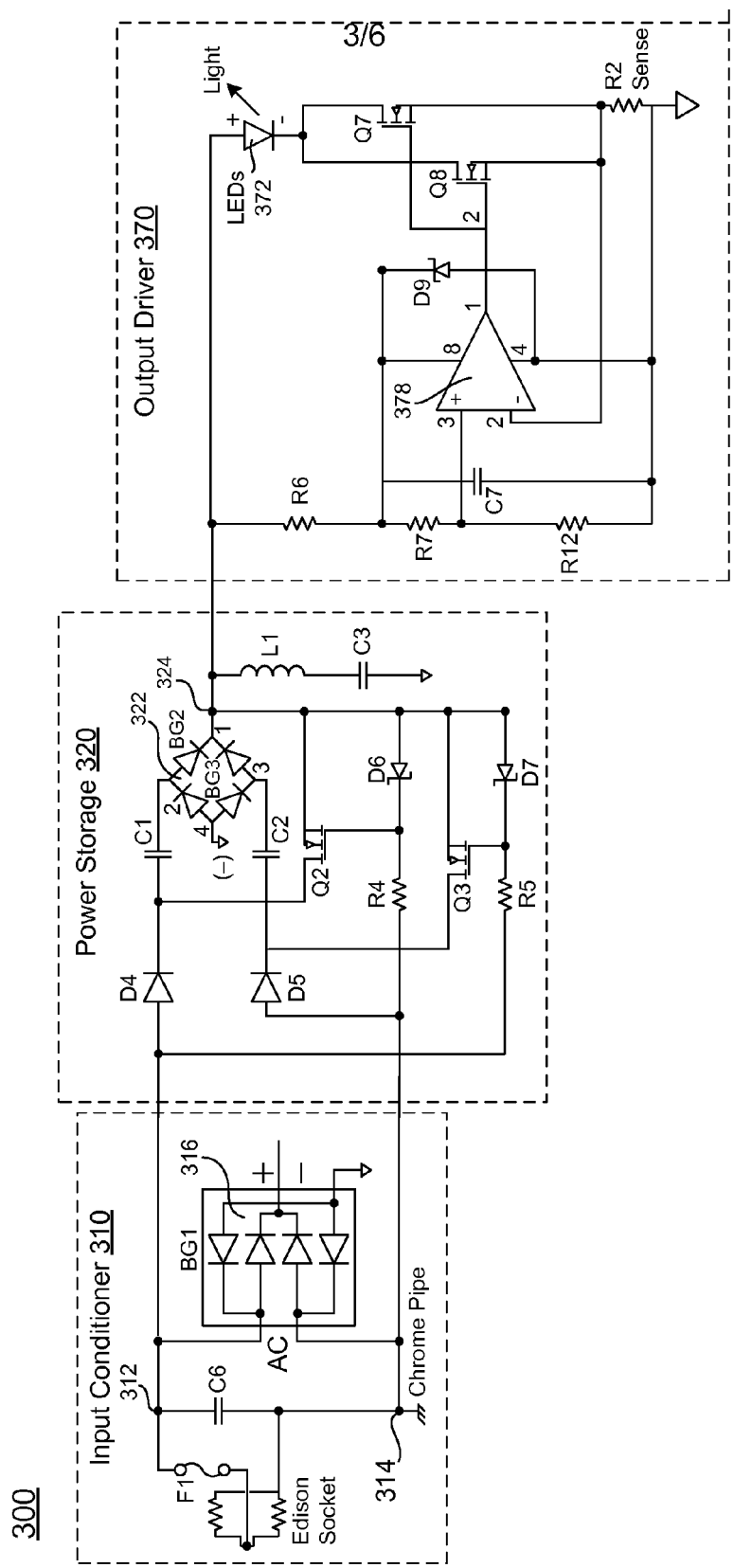
FIG. 3 is a detailed schematic diagram illustrating an example embodiment of the driving circuit according to embodiments of the invention.
Figure 5:
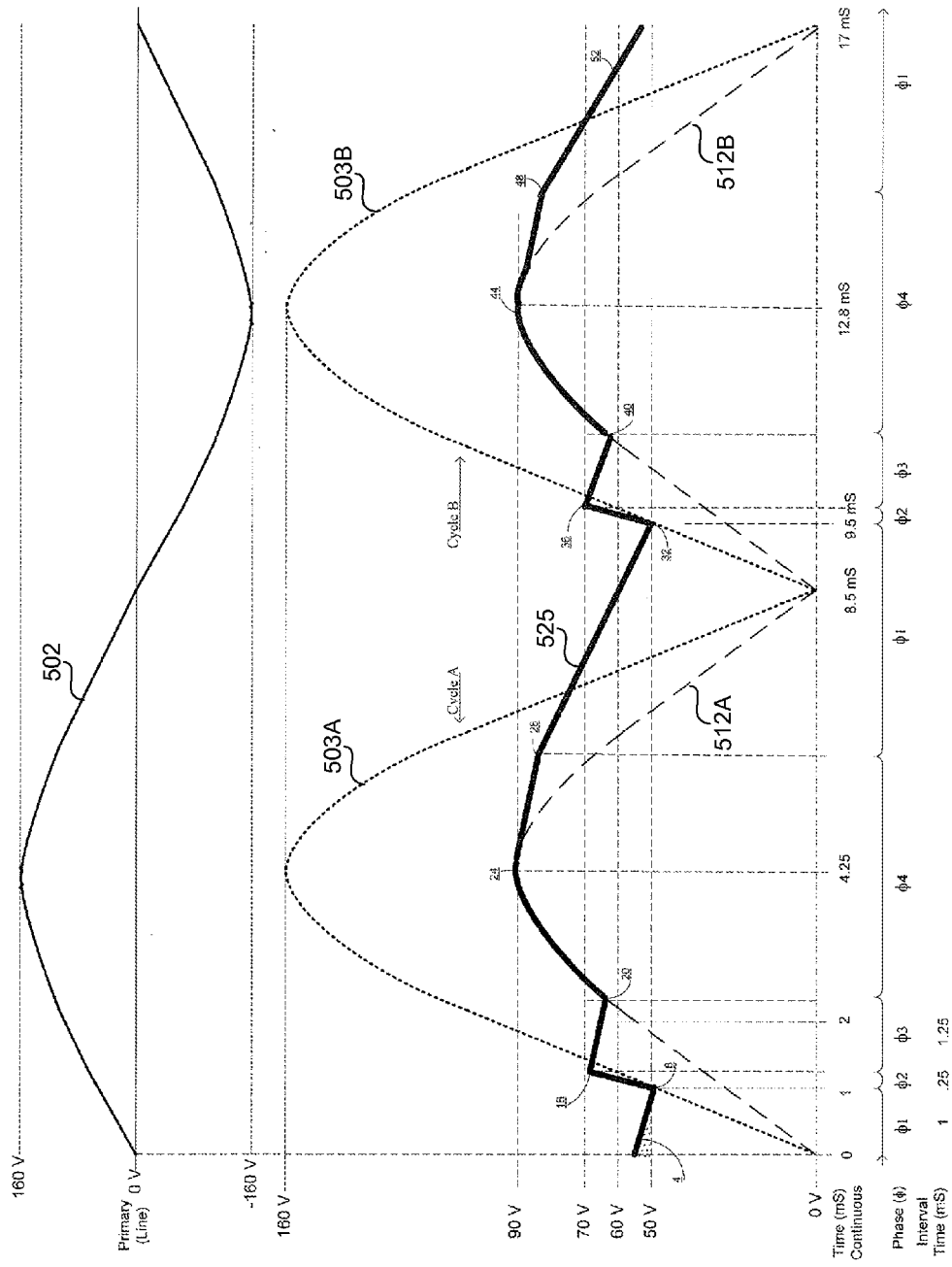
FIG. 5 is a waveform diagram illustrating many waveforms and outputs according to embodiments of the invention.

An embodiment of a driving circuit according to embodiments of the invention is illustrated in FIG. 3, and a timing diagram of the driving circuit is illustrated as FIG. 5. A simplified view of the circuit is illustrated as FIG. 2 for discussion purposes.

In general, with reference to FIG. 2, a current compensated circuit 240 may be an example of the driving circuit 40 of FIG. 1. The compensated circuit 240 includes an alternating current (AC) power source 212, which may rectified into a ½ wave that varies between 0 and 90 volts, as described below. A first capacitor 244 and a second capacitor 248 are coupled between the point of the highest voltage and a circuit ground, which is also the ground of the LED. A load current 250 represents current flowing through a group of LEDs. A compensation current 252 is coupled between nodes of the first capacitor 244. In general, the compensation current 252 increases the stability of the load current 250, keeping the load current more constant than if the compensation current 252 were not present. Looking at FIG. 2, it is recognizable that the voltage between the two capacitors 244, 248 have no DC path back to a supply or ground unless I compensation 252 and I load 250 are completely balanced. A controller 260 monitors the I load 250 and sends a signal to control the I compensation 252 to maintain a circuit balance, as described in more detail below. The compensation current 252 also keeps the output voltage of the circuit relatively stable, which allows the LEDs to shine relatively uniformly.

In operation, the AC signal charges the capacitor 244, which is then coupled through a switch (not shown) to the capacitor 248. Charge passes from the capacitor 244 to capacitor 248, raising the voltage on the capacitor 248. After the switch has coupled the capacitors 244, 248, the rising AC signal charges both capacitors 244, 248. After the AC signal reaches its voltage peak and starts to fall, the capacitor 248 discharges by virtue of driving the load current 258. Eventually during the AC cycle the switch (not shown) disconnects the capacitor 244 from the capacitor 248 and the capacitor 248 continues to discharge, providing power to the LED bulbs. Then, the cycle repeats the process with the switch re-connecting the again-charged capacitor 244 to the capacitor 248 as the capacitor 248 is discharging. In practice, the capacitor 244 of the compensated circuit 240 may be formed by two physical capacitors, one of that is active for the first half of an AC signal cycle, and the other one active during the second half of the AC signal cycle.

With reference to FIG. 3, a driving circuit 300 generally includes an input portion 310, an energy storage section 320, and an output driving section 370.

The input portion 310 includes two nodes, 312, 314 coupled to AC power, such as power supplied from a standard light socket. Embodiments of the invention work regardless of the input voltage and frequency, but have been optimized for 120v, 60 Hz AC power.

A capacitor C6 is coupled between nodes 312, 314, as is a bridge rectifying circuit 316. As is known, the bridge rectifying circuit converts Alternating Current (AC) to Direct Current (DC), so that the voltage output of the bridge rectifying circuit 316 is always positive. In a preferred embodiment, the output of the bridge rectifying circuit 316 has a maximum voltage of approximately 90 volts.

The AC input nodes 312, 314 are also coupled to the energy storage section 320 of the circuit 300. In general, a capacitor C1 and C2 are each coupled respectfully to one of the AC input nodes 312, 314, and both capacitors C1 and C2 are coupled to a second bridge rectifier 322. The output of the second bridge rectifier 322 is referred to as a node 324.

A switch Q2 is coupled between the node 324 and the capacitor C1, while switch Q3 is coupled between the node 324 and the capacitor C2. The switches Q2 and Q3 may be implemented by transistors, as is known in the art. When the switches Q2 and Q3 are implemented by transistors, the gates of Q2 and Q3 may be connected to the AC input nodes 312, 314, as illustrated in FIG. 3.

A diode D4 prevents current from flowing out of the capacitor C1 into the AC input 312, while a diode D5 prevents current flowing from the capacitor C2 to the AC input 314.

An inductor L1, which in implementation may be very large, such as 0.5-3 mH, is coupled to capacitor C3, which is the main source of stored power for driving the output driving section 370. The inductor L1 is coupled to the node 324, which is the output from the second bridge rectifying circuit 322. The capacitor C3 is coupled between the inductor L1 and circuit ground, illustrated with an open arrowhead, which may be a different voltage reference than earth ground.

An output driving portion 370 of the driving circuit 300 most importantly includes the LEDs 372, which are the components ultimately driven by the driving circuit 300. As mentioned above, in one embodiment the individual LED components in the LEDs 372 may generally be connected in series, which means the current flowing through each of the devices is identical or nearly identical. The LEDs 372 are coupled to ground through one of Q7 or Q8. A reference diode D9, which may be a schottky diode, controls the amount of current that flows through the LEDs 372. In a preferred embodiment, there are twelve LEDs in the group of LEDs 372, each of which is series connected. Of course, other configurations are possible depending on desired parameters such as the amount of light output from the bulb 10.

Another important feature of the output driving portion 370 of the driving circuit 300 centers around the operational amplifier 378. Inputs to the op amp 378 are coupled to either side of a sensing resistor R2, which is used to sense the current passing through the LEDs 372. The op amp 378 then generates its output to operate transistors as current sources so that the amount of current passing through the LEDs 372 is balanced by the current passing through the transistors Q7 and Q8. This is an example of controlling the compensated current 252 referred to above with reference to FIG. 2.

In operation, and with reference to FIGS. 3, 4 and 5, the AC signal input generally cycles between +/−160 volts (giving an RMS (Root Mean Squared) voltage of approximately 120 volts AC). This is illustrated in the top portion of FIG. 5. A rectifier, such as the BG1, reference 316 of FIG. 3, modifies the input AC signal so that it is always positive. Thus, the lower portion of FIG. 5 shows two identical phases in a full cycle in which the voltage starts at zero, rises to 160v and returns to zero. The phases are generally labeled phase A and phase B or cycle A and cycle B, which together make a single AC cycle.

FIG. 4 is a phase table that is used in conjunction with the timing diagram illustrated in FIG. 5, which describes an AC cycle 502 (solid line going from 0 to 160 v in the top portion of FIG. 5), rectified one-half AC cycles 503A and 503B, illustrated by a dotted line), dashed lines 512A and 512B which have the same period as the rectified AC cycles 503A and 503B but have an amplitude limited at 90 v, and a heavy line labeled 525, which illustrates the voltage at Node 324, which is the output of the capacitor C3 after it has passed through the inductor L1.

In general, capacitor C1 is active in cycle A, while the capacitor C2 is building and storing charge. Then, in cycle B, capacitor C2 is active while capacitor C1 is building and storing charge.

The cycle begins in FIG. 5 partially through phase A1 (AΦ1). During this phase, the capacitor C3 is discharging from about 85 volts to approximately 50 volts, with the energy discharging to power the LEDs 372 of FIG. 3. At the beginning of phase A2 (AΦ2), the switch Q2 connects the capacitor C1 to C3, and charge previously stored in the capacitor C1 charges capacitor C3, which causes the voltage on C3 to raise to approximately 70 volts, as illustrated in FIG. 4. Including the inductor L1 in series with the capacitor C3 prevents a large rush of current that would otherwise occur when the capacitor C1 is connected to C3 in the A2 (AΦ2) stage. Including the inductor L1 prevents premature wear of circuit components, as well as reducing noise or other interference generated by the circuit 300.

Also in stage A2 (AΦ2) is the nulling of the amplifier 378 during the time when the two capacitors, C1 and C3 in this phase, add their voltages. These voltages carry both the input signal and the error signal from component tolerances also get nulled.

In phase A3 (AΦ3), the voltage on the coupled capacitors C1 and C3 falls as the LEDs 372 continue to draw current from them.

During this time, between phases A2 and A3, some current, approximately 50 uA, is dissipated across the inductor L1 as the capacitor C3 is rapidly charged and then discharges. The inductor is an important feature of the driving circuit 300, though. Without the inductor L1, a large amount of current would surge through the switch Q2 as it turns on, because such action effectively couples the two capacitors directly together while they may have different charges. Thus, without the inductor L1, a current spike would occur as capacitor C3 was charged by C1 during phase A2. If all of the components were ideal components, the current would actually be infinite. Instead, were the inductor L1 not present, the brunt of the large current spike would be borne by the switch Q2. Additionally, such a current spike would cause a large amount of EMI (Electro-Magnetic Interference), which is greatly diminished by including the inductor L1 within the driving circuit 300.

Returning back to FIGS. 4 and 5, In phase A4 (AΦ4), the coupled capacitors C1 and C3 are both charged by the incoming AC voltage to approximately 90 volts. After the peak voltage is reached, the capacitors C1 and C3 discharge by powering the LEDs 372. At the end of A4 (AΦ4), the capacitor Q2 turns off, which disconnects the capacitor C1 from the capacitor C3.

In phase B1 (BΦ1), the capacitor C3 continues to discharge, powering the LEDs 372, while the AC input signal drops to zero. The stored charge in capacitor C3 continues to discharge, however, until the beginning of phase B2 (BΦ2). At that time, the beginning of phase B2, the switch Q3 turns on, which connects the capacitor C2 to the capacitor C3. The same benefits of having the inductor L1 used during the A2 (AΦ2) phase are present during the (BΦ2) phase.

From there, the remainder of the phases B3 and B4 continue just as the phases A3 and A4 previously, except that it is the capacitor C2 connected to the capacitor C3, through the operation of the switch Q3, rather than the capacitor C1 connected to the capacitor C3.

Overall, the operation of the driving circuit 300 compared to other driving circuits keeps the output voltage low, providing only what the LEDs 372 need. In one embodiment, the LED elements making up the group of LEDs 372 use approximately 3.5V each, for a total of 3.5V× 13LEDs=42V. The AC input cycles between 0V and approximately 90V, which averages at approximately 40-45 volts. Any voltage higher than the 45 volt operating voltage wastes power in the driver circuit, which produces excess heat, while any lower voltage produces less light from the LEDs.

Figure 6A:
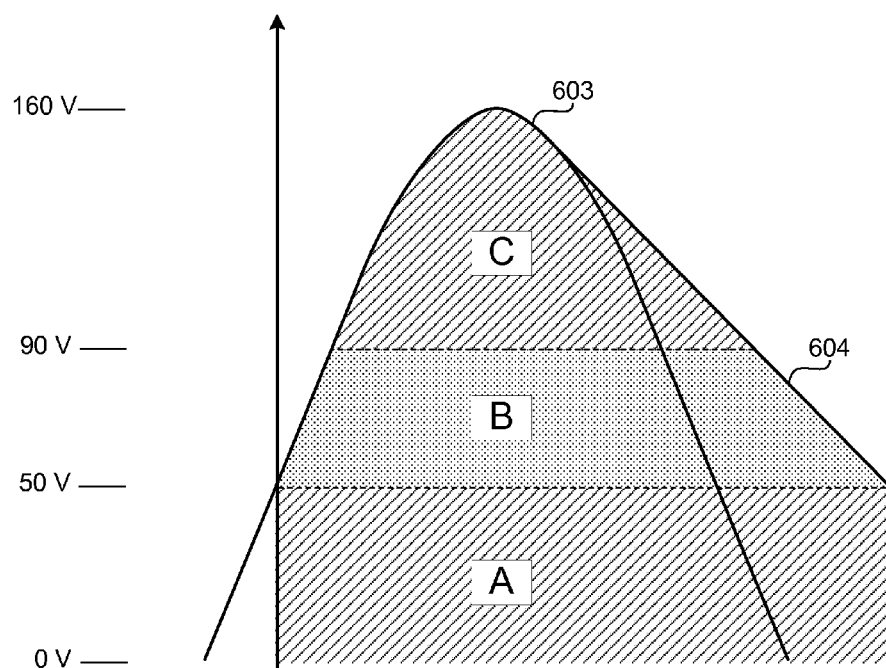
FIGS. 6A and 6B are waveform diagrams illustrating power savings achieved using embodiments of the invention.
Figure 6B:
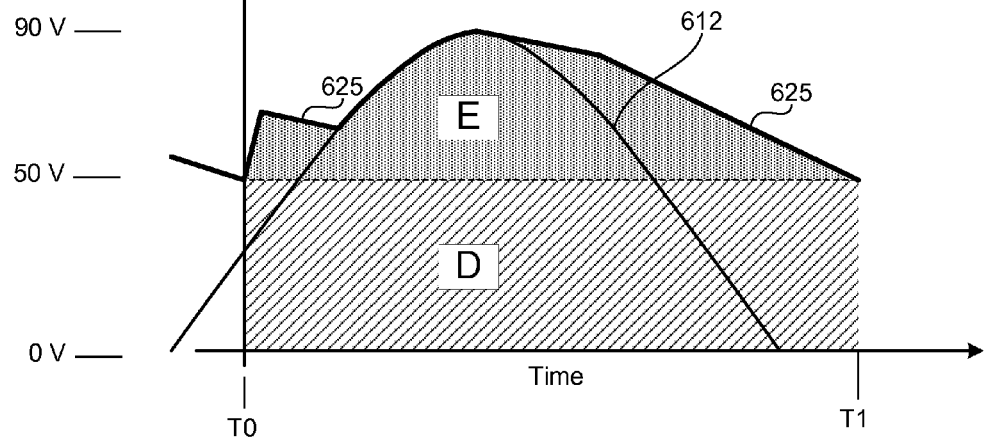

FIGS. 6A and 6B better illustrates the power savings achieved using embodiments of the invention. Shown are two voltage graphs during times T0 and T1. In FIG. 6A, a voltage trace 603 shows a voltage rising from 0 to 160 volts. A standard AC voltage would then return to zero volts, such as illustrated in FIG. 5, however, the trace 604 in FIG. 6A includes delay from capacitors in the network illustrated in FIG. 5, and therefore has a slower decay.

Signal trace 625 in FIG. 6B matches the output signal 525 of FIG. 5 that is used to drive the LEDs according to embodiments of the invention. Signal trace 625 likewise includes capacitive delay, and, for this and other reasons, does not return to zero as quickly as signal trace 612.

Another significant difference between traces 604 and 625 is that signal trace 604 has a maximum voltage of 160 v, while signal trace 625 has a maximum voltage of approximately 90 v.

Area under a voltage curve has a direct relationship to power consumed while operating a device with the voltage. For example, In FIG. 6A an area bounded by times T0 and T1 on the left and right, 0 volts on the bottom, and the signal trace 604 on the top has a first area. The first area is the total of area portions A, B, and C. Similarly, in FIG. 6B an area bounded by times T0 and T1 on the left and right, 0 volts on the bottom, and the signal trace 625 on the top has a second area. The second area is made of area portions D and E.

Comparing the area portions illustrates the power savings by using a driving circuit according to embodiments of the invention. Areas A and D represent energy consumed, typically expressed as heat, while operating the circuit below a turn-on voltage of the multiple LEDs described above. Areas A and D are approximately similar. Area B represents the power used if the voltage signal that makes the signal trace 604 were used to operate LEDs. In other words, energy consumed in Area B generates heat in the driving circuit, but additionally generates light by lighting LEDs. Area E similarly is that energy consumed making heat in the driving circuit and light by lighting the LEDs. A large difference between the areas under the graphs of FIGS. 6A and 6B is illustrated with area C, however. Area C represents heat generated if a capacitor-modified AC signal 604 were used to drive a group of LEDs, as is the case with some driving circuits. This heat is wasted, however, because the group of LEDs does not shine any brighter if the driving voltage is operated above approximately 90 volts. Therefore the heat generated in Area C represents energy wasted in other, standard, driving circuits.

Comparing the first and second areas of FIGS. 6A and 6B shows that a standard driving circuit of FIG. 6A is approximately 40.5% efficient, while the driving circuit of 6B according to embodiments of the invention is approximately 61.8% efficient. Thus, LEDs driven with a driving circuit according to embodiments of the invention is more efficient, and consumes less energy than standard driving circuits.

Having described and illustrated the principles of the invention with reference to illustrated embodiments, it will be recognized that the illustrated embodiments may be modified in arrangement and detail without departing from such principles, and may be combined in any desired manner. And although the foregoing discussion has focused on particular embodiments, other configurations are contemplated.

In particular, even though expressions such as "according to an embodiment of the invention" or the like are used herein, these phrases are meant to generally reference embodiment possibilities, and are not intended to limit the invention to particular embodiment configurations. As used herein, these terms may reference the same or different embodiments that are combinable into other embodiments.

Consequently, in view of the wide variety of permutations to the embodiments described herein, this detailed description and accompanying material is intended to be illustrative only, and should not be taken as limiting the scope of the invention. What is claimed as the invention, therefore, is all such modifications as may come within the scope and spirit of the following claims and equivalents thereto.

What is claimed is:

1. A driving circuit for a plurality of Light Emitting Diode devices (LEDs), the driving circuit comprising:
   an input conditioning portion including:
      a first input node coupled to an alternating current power supply,
      a second input node coupled to the alternating current power supply, and
      a first bridge rectifying circuit coupled to the first node and the second node structured to rectify an input signal;
   a power storage portion coupled to the input conditioning portion, the power storage portion including:
      a second bridge rectifying circuit with an output coupled to an output driving capacitor through an inductor, the output driving capacitor and inductor coupled in series,
      a first capacitor coupled to the first input node through a first diode and coupled to the second bridge rectifying circuit, a second capacitor coupled to the second input node through a second diode and coupled to the second bridge rectifying circuit, a first controllable switch coupled between the output of the second bridge rectifying circuit and the first node, when the first controllable switch is activated, the first capacitor is connected to the output driving capacitor, a second controllable switch coupled between the output of the second bridge rectifying circuit and the second node, when the second controllable switch is activated, the second capacitor is connected to the output driving capacitor; and an output driver coupled to the plurality of LED devices and receiving an input from the output driving capacitor of the power storage portion.

2. The driving circuit for a plurality of Light Emitting Diode devices (LEDs) according to claim 1, in which the output driver comprises a controlled current generator that operates in series to the LEDs.

3. The driving circuit for a plurality of Light Emitting Diode devices (LEDs) according to claim 2 in which an operational amplifier controls the controlled current generator.

4. The driving circuit for a plurality of Light Emitting Diode devices (LEDs) according to claim 3 in which an input to the operational amplifier is related to an amount of instantaneous current flowing through the LEDs.

5. The driving circuit for a plurality of Light Emitting Diode devices (LEDs) according to claim 1 in which the first controllable switch and the second controllable switch are transistors.

6. A method of driving a plurality of Light Emitting Diode devices (LEDs), the method comprising:

receiving an input signal that has a varying voltage at a first node and a second node;

limiting the varying voltage to a maximum voltage via a first bridge rectifying circuit;

receiving power from the first bridge rectifying circuit in a second bridge rectifying circuit;

connecting a first capacitor to an LED power delivery component during a first phase through a first controllable switch coupled between an output of the second bridge rectifying circuit and the first node to increase a voltage of the LED power delivery component through an inductor that is series-coupled to the LED power delivery component;

connecting a second capacitor to the at least one power storage device during a second phase through a second controllable switch coupled between an output of the second bridge rectifying circuit and the second node to increase a voltage of the LED power delivery component through the inductor that is series-coupled to the LED power delivery component; and driving the LEDs from the power delivery component.

7. The method of driving a plurality of Light Emitting Diode devices (LEDs) according to claim 6, further comprising:

sensing an amount of current flowing through the LEDs; and controlling a current through a component that approximately matches the amount of current flowing through the LEDs.

8. The method of driving a plurality of Light Emitting Diode devices (LEDs) according to claim 7 in which the component is coupled in series to the LEDs.

9. The method of driving a plurality of Light Emitting Diode devices (LEDs) according to claim 7 in which sensing an amount of current flowing through the LEDs comprises monitoring voltage across a sensing transistor, and providing the monitored voltage as a voltage difference across a differentiating input to the operation amplifier.

* * * * *